C. T. RAY.
PLANTER OR THE LIKE.
APPLICATION FILED APR. 27, 1914.
1,171,885.  Patented Feb. 15, 1916.
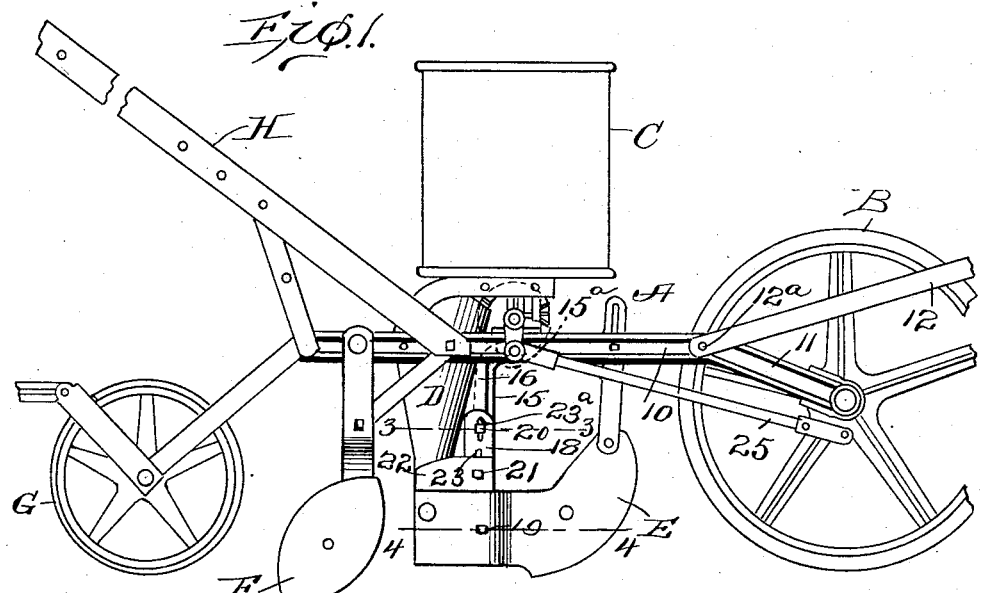
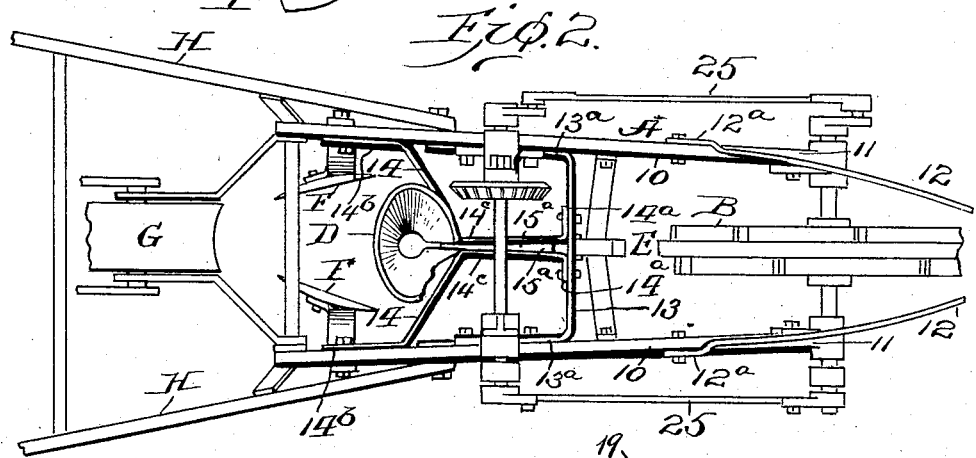
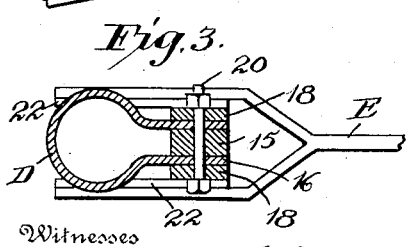
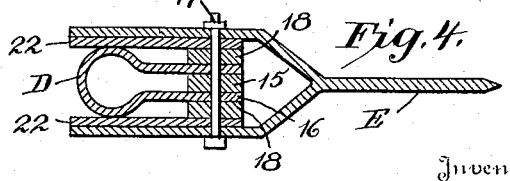

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

PLANTER OR THE LIKE.

1,171,885.  Specification of Letters Patent.  Patented Feb. 15, 1916.

Original application filed February 25, 1911, Serial No. 610,722. Divided and application filed November 29, 1911, Serial No. 663,133. Divided and this application filed April 27, 1914. Serial No. 834,810.

*To all whom it may concern:*

Be it known that I, CHARLES T. RAY, a citizen of the United States, residing at Louisville, in the county of Jefferson and State of Kentucky, have invented new and useful Improvements in Planters or the like, of which the following is a specification.

The present invention is a division of my application for Letters Patent of the United States, filed November 29, 1911, Serial No. 663,133, which, in turn, was a division of my application filed February 25, 1911, Serial No. 610,722, the subject matter of the present invention relating particularly to the seed chute and means for supporting the same.

The objects and advantages of the present invention will be understood from the hereinafter description.

In the accompanying drawings, illustrating the invention and wherein like characters of reference denote corresponding parts in the several views: Figure 1 is a side elevation of a planter embodying the present improvements; Fig. 2 is a plan view of the same. Fig. 3 is a horizontal detail section on the line 3—3 of Fig. 1. Fig. 4 is a horizontal detail section on the line 4—4 of Fig. 1.

A designates the frame, B the front wheel, C the hopper, D the seed chute, E the furrow opener, F the seed coverers, G the rear or press wheel or roller and H, H the handles of a planter selected to exemplify the present invention.

The frame comprises two longitudinal members 10, 10 which are preferably formed of I-bars, as shown, but they may be of other channel or flanged bars, or of straps or plane bar form, if desired. The front wheel B is journaled in members 11, 11 which depend from the members 10, 10 of the frame and are exemplified as being integral with the latter. The members 10 are preferably provided with forwardly converging draft bars 12, 12 which are preferably pivoted thereto at their rear ends 12ª and provided with a draft eye at their front ends. A bar, 13, extends transversely of the frame intermediate of the length thereof and has its ends flanged as shown at 13ª and securely fastened to the members 10. A pair of straps, 14, 14, having flanged or laterally bent forward ends 14ª secured to the bar 13 and flanged rear ends 14ᵇ secured to the members 10, are bent to extend laterally toward each other from their rear ends and thence forward in a substantially parallel spaced relation, as shown at 14ᶜ.

15 designates a standard which supports the seed chute D and furrow opener E. This standard is provided with a forwardly bent upper end 15ª which occupies the space between the parallel portions 14ᶜ of the straps 14 and is suitably secured thereto so as to be supported thereby.

The furrow opener E herein shown is of the sword type but other forms of opener may be employed without departing from the spirit of the invention.

The seed chute D is provided with spaced flanged forward ends 16 which are disposed on opposite sides of the standard 15. Arms or plates 18, secured to the opener E at 19, are also attached to the standard by suitable means, such as the bolts 20 and 21. These arms or plates overlie the flanged forward ends 16 of the seed chute and underlie the forward sides of seed protectors or dirt shields 22, and the bolts or other fastening devices which secure the arms or plates to the standard also extend through the seed protectors and flanges of the seed chute and secure the said chute and protectors to the standard. It will be noted that the flanged forward ends of the chute and the seed protectors, as well as the opener, are effectively secured to the standard by the arms 18 and the fastening devices of the latter. It will further be noted that the parts are so arranged that the seed chute, seed protectors or dirt shields and opener are most effectively supported from the frame by simple and thoroughly practicable means. It will also be noted that the several parts which support the seed chute, seed protectors and opener are so correlated as to provide a simple and yet thoroughly well braced construction, which will effectively sustain the strains imposed thereon in practice.

In practice, it is preferred to provide the arms or plates 18 with elongated openings 23 and 23ª through which the bolts 20 and 21 respectively extend, in order to provide for vertical adjustment of the opener from the standard. The hopper C is pivotally mounted upon the frame and has suitable seed dropping mechanism arranged to control the flow of seed to the chute D. The seed dropping mechanism is preferably operated from the front wheel B through the medium of suitable mechanism including pitmen 25.

It is not considered to be necessary to particularly set forth herein any special pivotal mounting for the hopper or the seed dropping mechanism which I prefer to use for the reason that the same form no essential part of the present invention and are particularly set forth in application Number 663,130, filed November 29, 1911, as a division of my application No. 610,722 hereinbefore referred to, and in the latter application and also in application No. 663,133 and in application No. 835,009, filed April 27, 1914.

In practice, the supporting means of the rear or press wheel H is arranged so that it can be adjusted pivotally, and means are provided for holding it in various selected adjustments, to regulate the depth of operation of the implement, or for transporting purposes. I do not consider it necessary to show this particular part of the implement in the present application as it is fully set forth in my application No. 610,722, to which reference may be had for full information relative thereto.

Having now described my invention what I believe to be new and desire to secure by Letters Patent, is:—

1. In a machine of the kind described, a frame, an opener-standard supported thereby, an opener, a seed-chute and common, vertically adjustable means, for connecting the opener to the chute and the chute and opener to the standard.

2. In a machine of the kind described, a frame, an opener-standard supported thereby, an opener, a seed-chute and common, vertically adjustable means, for connecting the opener to the chute and the chute and opener to the standard, comprising vertically slotted arms connected to the opener and embracing the chute and standard, and suitable bolts passing through the slots.

3. In a machine of the kind described, a frame, an opener having members projecting rearward from the front portion thereof, a seed chute having spaced forward edges, a standard secured to the frame and depending between said edges, and vertically adjustable supporting means connected to the front portion of the opener and to said members, respectively, the supporting means connected to said members constituting also clamp members to engage the outer surfaces of the chute edges and force them against the standard.

4. In a machine of the kind described, a frame comprising longitudinal members and bracing and stiffening means therefor, the bracing and stiffening means comprising a cross bar connecting the longitudinal members, other longitudinal members which are fixedly connected with the first-mentioned members and have portions extending convergently and other portions which extend approximately parallel with each other and secured to the cross bar, an opener, a standard having members arranged at an angle with each other, one of said members being secured between the approximately parallel portions of the bracing and stiffening means, the other member depending from the first mentioned member of the standard, a seed chute having a longitudinal opening in its forward side which receives the depending portion of the standard, and vertically adjustable means for securing the opener and seed chute to the standard.

5. In a machine of the kind described, a frame, a standard depending therefrom, a seed chute having spaced forward edge parts embracing the standard, an opener, bars on the opener embracing the spaced forward edges of the chute and the standard and provided with a plurality of vertical slots, seed protectors secured to the opener and embracing the bars and the lower end of the chute, and bolts passing through said slots, the standard and the edges of the chute to maintain all of these parts in adjusted positions.

6. In a machine of the kind described, a frame, a standard depending therefrom, a seed chute having forward edges embracing the standard, and an opener adjustably depending at its forward end from the frame and vertically adjustable at its rear end on the edges of the chute and the standard.

7. In a machine of the kind described, a frame, a standard depending therefrom, a seed chute having forward edges embracing the standard, and an opener adjustably depending at its forward end from the frame and vertically adjustable at its rear end on the edges of the chute and the standard by means of vertically slotted bars secured to the opener and embracing the edges of the chute, and bolts passing through said slots, the chute edges and the standards.

8. In a machine of the kind described, a frame comprising longitudinal members and bracing and stiffening means therefor, the bracing and stiffening means comprising longitudinal members which are fixedly connected with the first-mentioned members and have portions extending convergently and other portions which extend approximately parallel with each other, an opener standard having members arranged at an angle with each other, one of said members being secured between the approximately parallel portions of the bracing and stiffening means, the other member depending from the first mentioned member of the standard, a seed chute having a flanged forward side mounted on the depending portion of the standard, an opener, a seed protector arranged at the mouth of the chute, arms extending from the opener and overlying the flanged forward side of the seed chute and fastening elements for securing the arms, chute and seed protector to the depending part of the standard.

9. In a machine of the kind described, a frame comprising longitudinal members and bracing and stiffening means therefor, the bracing and stiffening means comprising longitudinal members which are fixedly connected with the first-mentioned members and have portions extending convergently and other portions which extend approximately parallel with each other, an opener standard having members arranged at an angle with each other, one of said members being secured between the approximately parallel portions of the bracing and stiffening means, the other member depending from the first mentioned member of the standard, a seed chute having a flanged forward side mounted on the depending portion of the standard, a sword opener whose forward portion is connected to the frame, said opener being provided rearward of its said forward portion with arms which overlie the flanged forward side of the seed chute and fastening means for securing said arms and the seed chute to the depending portion of the standard.

10. In a machine of the kind described, a frame comprising longitudinal members and bracing and stiffening means therefor, the bracing and stiffening means comprising longitudinal members which are fixedly connected with the first-mentioned members and have portions extending convergently and other portions which extend approximately parallel with each other, an opener standard having members arranged at an angle with each other, one of said members being secured between the approximately parallel portions of the bracing and stiffening means, the other member depending from the first mentioned member of the standard, a seed chute having a flanged forward side mounted on the depending portion of the standard, a sword opener whose forward portion is connected to the frame, a seed protector arranged at the mouth of the chute, arms extending from the opener and overlying the flanged forward side of the seed chute and underlying the walls of the seed protector, and fastening elements for securing the arms, chute and seed protector to the depending part of the standard.

In testimony whereof I have hereunto set my hand in presence of two subscribing witnesses.

CHARLES T. RAY.

Witnesses:
J. K. SCOGGAN,
W. M. JOHNSTON.

Copies of this patent may be obtained for five cents each, by addressing the "Commissioner of Patents, Washington, D. C."